United States Patent
Olofson et al.

(10) Patent No.: US 7,050,227 B2
(45) Date of Patent: May 23, 2006

(54) COMPOSITION FOR MICROSTRUCTURED SCREENS

(75) Inventors: Peter M. Olofson, Oakdale, MN (US); Patrick A. Thomas, Maplewood, MN (US); Amy J. Gates, Cottage Grove, MN (US); George G. I. Moore, Afton, MN (US); Patricia M. Savu, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 10 days.

(21) Appl. No.: 10/733,479

(22) Filed: Dec. 11, 2003

(65) Prior Publication Data

US 2005/0128580 A1 Jun. 16, 2005

(51) Int. Cl.
| | |
|---|---|
| G03B 21/56 | (2006.01) |
| B32B 27/00 | (2006.01) |
| C09J 101/00 | (2006.01) |
| C09J 201/00 | (2006.01) |
| C08J 7/18 | (2006.01) |

(52) U.S. Cl. .............. 359/443; 359/460; 428/463; 524/847; 156/331.8; 427/487

(58) Field of Classification Search ........... 359/443, 359/452, 453, 454, 460; 445/24; 428/463; 524/847; 156/331.8; 427/487
See application file for complete search history.

(56) References Cited

U.S. PATENT DOCUMENTS

| | | | |
|---|---|---|---|
| 5,104,929 A | 4/1992 | Bilkadi ............ 524/847 |
| 5,126,189 A | 6/1992 | Tanny et al. ............ 428/220 |
| 5,128,387 A | 7/1992 | Shustack ............ 522/92 |
| 5,462,700 A | 10/1995 | Beeson et al. ............ 123/193.2 |
| 5,481,385 A | 1/1996 | Zimmerman et al. ......... 359/40 |
| 5,521,728 A | 5/1996 | Kodate et al. ............. 359/59 |
| 5,609,990 A | 3/1997 | Ha et al. ............. 430/270.11 |
| 5,633,049 A | 5/1997 | Bilkadi et al. ............. 427/487 |
| 6,417,966 B1 | 7/2002 | Moshrefzadeh et al. .... 359/453 |
| 2002/0080484 A1 | 6/2002 | Moshrefzadeh et al. .... 359/460 |
| 2003/0027886 A1 | 2/2003 | Novicky ............ 523/106 |
| 2003/0139549 A1 | 7/2003 | Savu et al. ............ 562/243 |
| 2003/0139550 A1 | 7/2003 | Savu et al. ............ 562/243 |
| 2003/0224688 A1 * | 12/2003 | Sugimoto et al. ............ 445/24 |
| 2004/0265602 A1 | 12/2004 | Kobayashi et al. ......... 428/458 |

FOREIGN PATENT DOCUMENTS

| | | |
|---|---|---|
| EP | 0 484 073 A | 5/1992 |
| EP | 0 595 702 | 5/1994 |
| EP | 0 851 246 | 7/1998 |
| EP | 1 491 946 A1 | 12/2004 |
| JP | 57 080025 | 5/1982 |
| JP | 04 078841 | 3/1992 |
| JP | 04 299329 | 10/1992 |
| JP | 04 350638 | 12/1992 |
| JP | 09 207237 | 8/1997 |
| WO | WO03/077026 | 9/2003 |

* cited by examiner

Primary Examiner—Melissa Jan Koval
(74) Attorney, Agent, or Firm—Elizabeth A. Gallo

(57) ABSTRACT

A composition having at least about 10 percent perfluoroalkylsulfonamideoethyl acrylate; at least about 5 percent aliphatic urethane acrylate oligomer; at least about 1 percent acrylate monomer; and less than about 84 percent other reactive and non-reactive components. The composition, with the addiction of a light absorbing pigment, is particularly useful as a light absorbing adhesive in an optical element such as a rear projection screen that incorporates totally internally reflecting structures to disperse the light passing through the screen.

63 Claims, 9 Drawing Sheets

COMPOSITION FOR MICROSTRUCTURED SCREENS

CROSS-REFERENCE TO RELATED APPLICATION(S)

This application incorporates by reference co-pending applications Ser. No. 10/733,066 filed Dec. 11, 2003, entitled "Microstructured Screen with Light Absorbing Material and Method of Manufacturing," by Patrick A. Thomas et al. and Ser. No. 10/732,993, filed Dec. 11, 2003, entitled "Microstructured Screen and Method of Manufacturing Using Coextrusion," by Kathryn M. Spurgeon et al.

BACKGROUND OF THE INVENTION

The present invention is directed generally to a composition for use in manufacturing a rear projection screen and the resulting screen, and more particularly to a rear projection screen that incorporates totally internally reflecting structures to disperse the light passing through the screen.

Rear projection screens are generally designed to transmit an image projected onto the rear of the screen into a viewing space. The viewing space of the projection system may be relatively large (e.g., rear projection televisions), or relatively small (e.g., rear projection data monitors). The performance of a rear projection screen can be described in terms of various characteristics of the screen. Typical screen characteristics used to describe a screen's performance include gain, viewing angle, resolution, contrast, the presence of undesirable artifacts such as color and speckle, and the like.

It is generally desirable to have a rear projection screen that has high resolution, high contrast and a large gain. It is also desirable that the screen spread the light over a large viewing space. Unfortunately, as one screen characteristic is improved, one or more other screen characteristics often degrade. For example, the horizontal viewing angle may be changed in order to accommodate viewers positioned at a wide range of positions relative to the screen. However, increasing the horizontal viewing angle may also result in increasing the vertical viewing angle beyond what is necessary for the particular application, and so the overall screen gain is reduced. As a result, certain tradeoffs are made in screen characteristics and performance in order to produce a screen that has acceptable overall performance for the particular rear projection display application.

In U.S. Pat. No. 6,417,966, incorporated herein by reference, Moshrefzadeh et al. disclose a screen having reflecting surfaces disposed so as to reflect light passing therethrough into at least one dispersion plane. The screen thereby permits asymmetric dispersion of image light in a rear projection system and allows the light to be selectively directed towards the viewer. Moshrefzadeh et al. also teach methods for manufacturing the screen, including combinations of steps using casting and curing processes, coating techniques, planarization methods, and removing overcoating materials.

BRIEF SUMMARY OF THE INVENTION

The present invention is a composition having at least about 10 percent perfluoroalkylsulfonamideoethyl acrylate; at least about 5 percent aliphatic urethane acrylate oligomer; at least about 1 percent acrylate monomer; and less than about 84 percent other reactive and non-reactive components. The composition, with the addition of a light absorbing pigment, is particularly useful as a light absorbing adhesive in an optical element such as a rear projection screen that incorporates totally internally reflecting structures to disperse the light passing through the screen.

BRIEF DESCRIPTION OF THE DRAWINGS

The present invention will be further explained with references to the drawing figures below, wherein like structure is referred to by like numerals throughout the several views.

Figure 1:
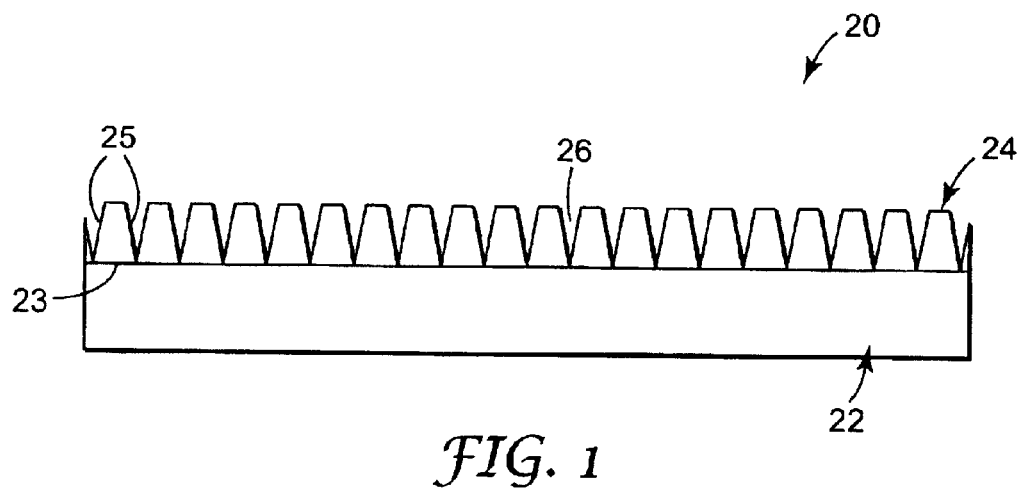
FIG. 1 is a side elevation view of a microrib screen structure.

While the above-identified drawing figures set forth several embodiments of the invention, other embodiments are also contemplated. This disclosure presents illustrative embodiments of the present invention by way of representation and not limitation. Numerous other modifications and embodiments can be devised by those skilled in the art which fall within the scope and spirit of the principles of this invention. The drawing figures are not drawn to scale.

Moreover, while some embodiments are referred to by the designations "first," "second," "third," etc., it is to be understood that these descriptions are bestowed for convenience of reference and do not imply an order of preference. The designations are presented merely to distinguish between different embodiments for purposes of clarity.

DETAILED DESCRIPTION

FIG. 1 is a side elevation view of a microrib screen structure. Variations of the illustrated embodiments can be utilized for front projection and other screen applications, but they will be described primarily with reference to rear projection screen applications for the purposes of this disclosure. Microrib structure 20 includes a light transmitting base substrate 22 and microstructured diffusive ribs 24. The term "microstructured" includes features having characteristic dimensions measured in micrometers (μm) or smaller units. In general, microstructured features may have characteristic dimensions ranging from less than 0.01 μm to more than 100 μm. What constitutes a characteristic dimension of a feature depends on the type of feature. Examples include the width of trough-like features in a surface, the height of post-like protrusions on a surface, and the radius of curvature at the point of sharp protrusions or indentions on a surface. Thus, even a macroscopic feature can be said to be microstructured if a characteristic dimension of the feature has dimensions with sub-micrometer tolerances. In a first embodiment, base substrate 22 is a light transmitting film of a material such as a polymer.

In one exemplary embodiment, linear ribs or microribs 24 are formed of an optical-grade host material such as a resin; in particular, the resin incorporates light scattering particles such as beads so that ribs 24 act as a bulk diffuser. A sufficiently high aspect ratio is chosen for the rib geometry in order to induce total internal reflection (TIR) in the microrib structure 20. In the embodiment shown in FIG. 1, the light diffusive ribs 24 are separated by V-shaped cavities or grooves 26. While light diffusive structures 24 are described in an exemplary embodiment as ribs that extend across substantially the entire width of base substrate 22, it is also contemplated that the structures 24, in an alternative embodiment, form discrete peaks that can be arranged upon base substrate 22 in a staggered, or "checkerboard" pattern, for example. In an exemplary embodiment, each structure 24 has a base 23 and a plurality of walls 25 which narrow the structure 24 as walls 25 extend from base 23.

A material such as a resin with a high refractive index (RI) is generally chosen for diffusive ribs 24. In this application, the RI of a rib 24 refers to the RI of the host material. Examples of suitable host materials for light diffusive ribs 24 include polymers such as modified acrylics, polycarbonate, polystyrene, polyester, polyolefin, polypropylene; and other optical polymers preferably having a refractive index equal to or greater than about 1.50.

Figure 2:
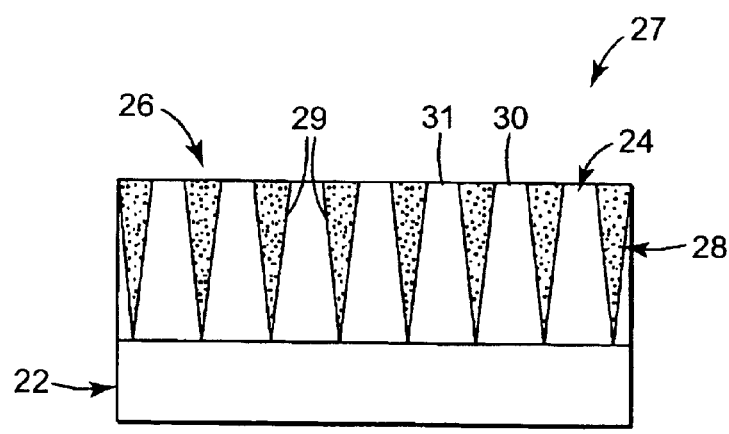
FIG. 2 is a side elevation view of the structure of FIG. 1 filled with light-absorbing material.

FIG. 2 is a side elevation view of the structure of FIG. 1 filled with light-absorbing material 28. Embedded microstructured film 27 includes filling material 28. Material 28 typically incorporates a black pigment or dye to absorb ambient light and improve contrast in the final screen construction. Optical material 28 has a low refractive index so that a relatively high difference in refractive index exists between light absorbing material 28 and the material composing light diffusive ribs 24. A refractive index difference of at least about 0.06 is desired. Such a difference induces efficient internal reflection and high screen performance. Internally reflecting surfaces 29 are formed by the interfaces between light diffusive ribs 24 and light absorbing material 28. In one exemplary embodiment, front surface 30 of embedded microstructured film 27 is a smooth or slightly matte surface with minimal land on the rib top surfaces 31. Totally internally reflecting surfaces 29 disperse light through optically transmitting areas 31 of front surface 30. Front surface 30 preferably has a matte surface finish that assists in scattering the light propagating therethrough.

In a first embodiment, light absorbing material 28 includes about 20% to about 50% (preferably about 39%) propoxylated neopentyl glycol diacrylate from Sartomer Company; about 50% to about 80% (preferably about 58%) proprietary RC-709 acrylated silicone from Goldschmidt Chemical; about 1% to about 3% (preferably about 2%) 2-hydroxy-2-methyl-1-phenyl-1-propanone photoinitiator; and about 1% lampblack dispersion (the lampblack dispersion contains about 67.5% tetrahydrofurfuryl acrylate from Sartomer Company; about 25% LB 1011 lampblack carbon black from Elementis Pigments; and about 7.5% EFKA 4046 (dried) from Lubrizol).

The propoxylated neopentyl glycol diacrylate increases adhesion to adhesive 64 (see FIG. 5) and has desirable toughness, flexibility, and low shrinkage properties; however, too much propoxylated neopentyl glycol diacrylate increases the RI of light absorbing material 28, which is not desirable. The RC-709 acrylated silicone from Goldschmidt Chemical desirably decreases RI; however, too much of it decreases adhesion to adhesive 64. The percentage of lampblack dispersion is dictated by the total concentration of carbon black that is desired in the total formulation, in this case about 3,000 ppm (parts per million). The use of EFKA 4046 in the lampblack dispersion is key to maintaining a dispersion of carbon black parties in the material 28 formulation for extended periods of time. Carbon black is not inherently compatible with acrylated silicone and will flocculate and settle when mixed with acrylated silicone without a dispersion agent.

To obtain a stable material 28 resin, the order of mixing components is important. In one embodiment, dried EFKA 4046 is obtained by first adding an approximate 4:1 ratio of heptane or hexane to the EFKA 4046 (the EFKA 4046 is dissolved in ethyl acetate from the supplier). The EFKA 4046 will precipitate out of solution and settle to the bottom of the container. The liquid is decanted and discarded. The wet solids are spread in a pan in a thickness of less than 1.27 cm (0.5 inch). The pan is placed in an oven at about 65.6° C. (150° F.) for about 24 to about 36 hours. The dried solids are then broken into small pieces for use. The lampblack dispersion is prepared by dissolving dried EFKA 4046 into tetrahydrofurfuryl acrylate; carbon black is added to the solution in a ball mill and mixed for about one hour. The lampblack dispersion is mixed with the propoxylated neopentyl glycol diacrylate with a high shear rotor-stator mixer to wet out the carbon black particles. Then the acrylated silicone and photoinitiator are added.

Adhesion between light absorbing material 28 and adhesive 64 may be enhanced by modification of front surface 30 by treatment, such as with corona discharge (including nitrogen or air corona treatments), plasma, priming, or using a tie layer. In one embodiment, a clear tie layer of non-silicone, cured acrylate is used to provide a bonding surface for adhesive 64.

Figure 3:
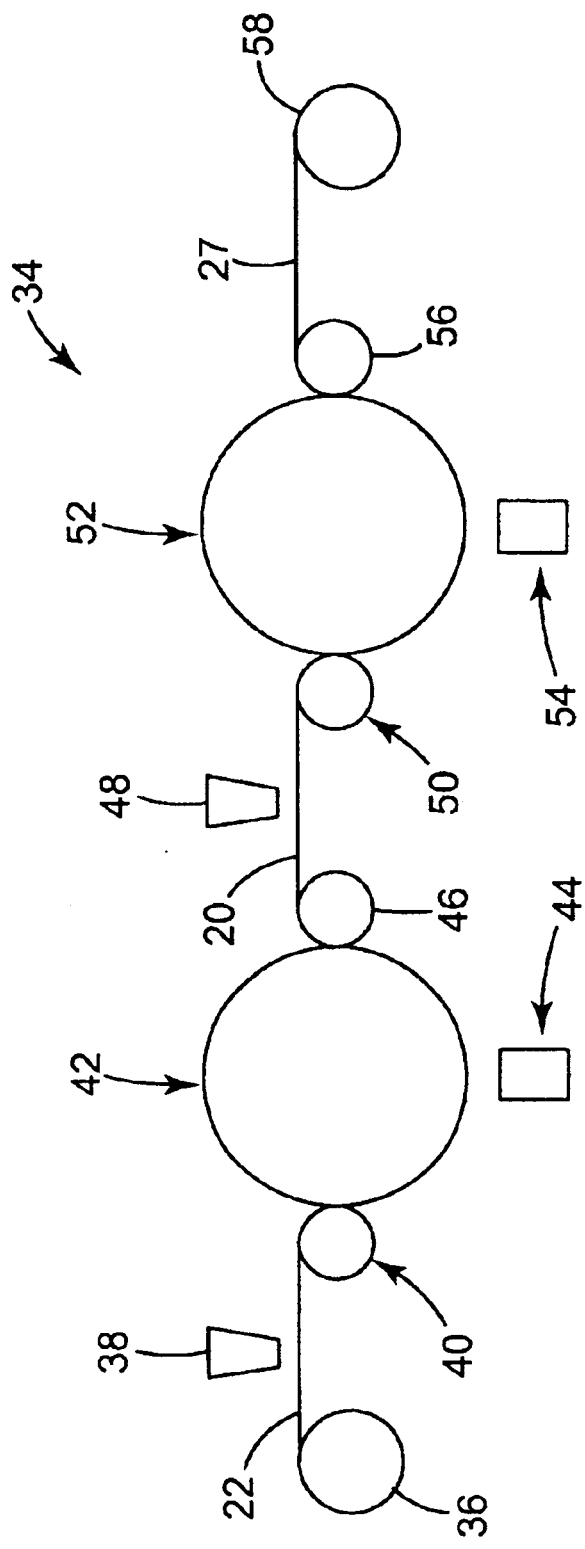
FIG. 3 is a diagram of one embodiment of a method for producing the structure of FIG. 1.

FIG. 3 is a diagram of one embodiment of a method for producing the structure of FIG. 1. A process for producing the screen structure 27 of FIG. 2 includes a microreplication process 32 to produce diffusive ribs 24 on base substrate 22 and a planarization process 34 to coat light absorbing material 28 onto the microrib structure 20 to form embedded microstructured film 27. The term "microreplication" includes a process whereby microstructured features are imparted from a master or a mold onto an article. The master is provided with a microstructure, for example by micromachining techniques such as diamond turning, laser ablation or photolithography. The surface or surfaces of the master having the microstructure may be covered with a hardenable material so that when the material is hardened, an article is formed that has a negative replica of the desired microstructured features. The microreplication may be accomplished using rolls, belts, and other apparatuses known in the art. Microreplication can be accomplished by techniques including but not limited to extruding, embossing, radiation curing and injection molding. Microreplication process 32 uses substrate unwind station 36, resin coating station 38, precision nip roll 40, microstructured cylinder 42, ultraviolet lamp 44 and precision nip roll 46. Planarization process 34 uses resin coating station 48, precision nip roll 50, a smooth, matte or microstructured cylinder 52, ultraviolet lamp 54, precision nip roll 56 and embedded microstructured film rewind 58.

In one embodiment, the microreplication process 32 and planarization process 34 are performed in sequence. Base substrate 22 is first unwound from substrate unwind station 36. Base substrate 22 is guided to pass into microreplication process 32 resin coating station 38, where the base is coated with a high refractive index resin incorporating light scattering particles. The base substrate 22 and light diffusive material coating are pressed by precision nip roll 40 against microstructured cylinder 42 to impart the ribbed structure to the light diffusive material. The cast structure is then cured by light from ultraviolet lamp 44 and microribbed structure 20 emerges from precision nip roll 46, resulting in the monolithic structure illustrated in FIG. 1.

Figure 4:
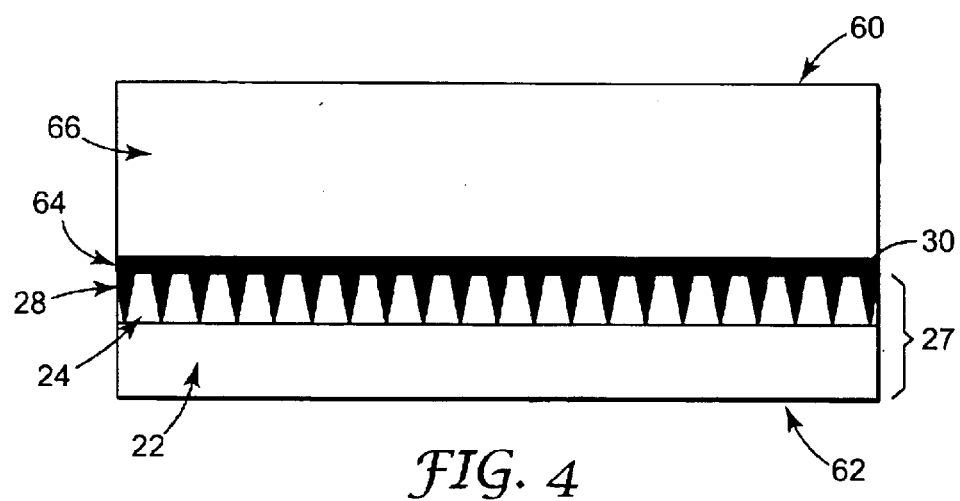
FIG. 4 illustrates the structure of FIG. 2 with additional layers.

Microrib structure 20 continues on to resin coating station 48, where it is overcoated with light absorbing material 28. The composite structure is pressed by precision nip roll 50 against cylinder 52. Cylinder 52 may be smooth, matte or microstructured to impart a desired texture upon front surface 30 of the resulting embedded planar microstructured film 27 shown in FIG. 2. After light absorbing material 28 is cast onto microrib structure 20, the film proceeds to be cured by light from ultraviolet lamp 54. A completed embedded microstructured film 27 emerges from precision nip roll 56 to be wound upon embedded microstructured film rewind 58. FIG. 4 illustrates the structure of FIG. 2 with additional layers: Shielded screen 60 incorporates embedded microstructured film 27 with back surface 62 and adhesive 64 on front surface 30 for the attachment of a light transmitting shield 66. Shield 66 is a protective layer that can be a film or sheet made of transparent material such as acrylic, polycarbonate or glass, for example. Shield 66 functions as a protective element so that the coated microstructured film 27 is not damaged by contact. Shield 66 is an optional component, though most applications benefit greatly from this protection. Shield 66 can be made to be anti-glare (matte), anti-reflective, anti-static, anti-scratch or smudge resistant, for example, through coatings, surface textures, or other means. In one embodiment, shield 66 is a 3 millimeter thick acrylic panel from Cyro Industries with a non-glare, matte outward-facing surface.

The thickness of base film 22 can be chosen to meet the requirements of each particular application. For example, a thin base film with a thickness of about 0.127 mm (5 mils) to about 0.254 mm (10 mils) can be chosen to provide for ease of manufacturing; alternatively, a thick film with a thickness of about 0.508 mm (20 mils) to about 1.016 mm (40 mils) can be chosen to provide additional product stiffness. Suitable materials include polycarbonate, polyester, acrylic, polyolefin, polypropylene and vinyl films, for example. In one exemplary embodiment, back surface 92 of base substrate 22 has a matte finish to reduce specular reflection back into the imaging system.

Shield 66 can also be varied to provide for different functionalities. Shield 66 can range in thickness from thin (less than about 0.508 mm (20 mils)) to semirigid (about 0.508 mm (20 mils) to about 1.016 mm (40 mils)) to rigid (greater than about 1.016 mm (40 mils)). The thickness of base substrate 22 and protective shield 66 can be chosen to yield a wide variety of products with these options impacting total material cost, optical functionality, overall construction stiffness and ease of processing.

Figure 5:
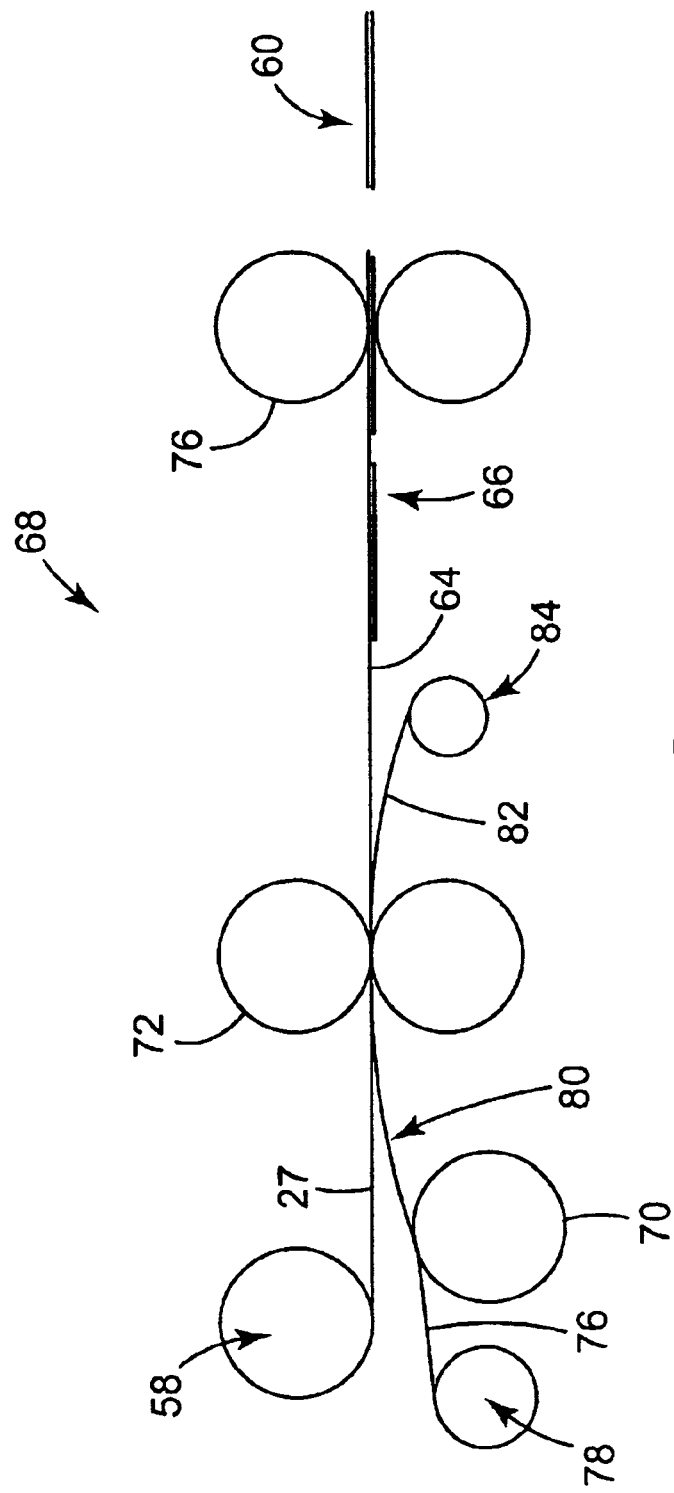
FIG. 5 is a diagram illustrating one embodiment of a method for producing the structure of FIG. 4.

FIG. 5 is a diagram illustrating one embodiment of a method for producing the structure of FIG. 4. In one embodiment, lamination process 68 directly follows planarization process 34 in a single assembly process. Lamination process 68 uses adhesive unwind 70, lamination nip assembly 72 and lamination nip assembly 74. Either of lamination nip assemblies 72 or 74 may be driven, or separate drive wheels or other drive mechanisms can be used to propel components through process 68. The adhesive material disposed on adhesive unwind 70 is typically a layer of pressure-sensitive adhesive sandwiched between two liner layers. When the adhesive material is unwound from adhesive unwind 70, top liner 76 is separated therefrom and wound upon top liner rewind 78. The remaining adhesive material 80 is contacted with embedded microstructured film 27, which is unwound from film unwind 58. Embedded microstructured film 27 and adhesive material 80 pass through lamination nip 72, where they are pressed together.

Thereafter, bottom liner 82 of the adhesive composite 80 is removed and wound onto bottom liner rewind 84. A shield 66 is introduced on a transversely traveling feed web or other suitable mechanism and disposed onto the exposed adhesive 64. The structure then passes through lamination nip 74, where shield 66 is pressed onto microstructured film 27 and adhered thereto by adhesive 64. The embedded microstructured film 27 can be severed between discrete shields 66 to form individual shielded screens 60. However, the lamination process can add significant cost to the overall product due to slow line speed, added yield cost, and material utilization. For example, use of the optical quality pressure-sensitive adhesive 64 is very expensive and leads to waste in the form of top liner 76 and bottom 82.

Figure 6:
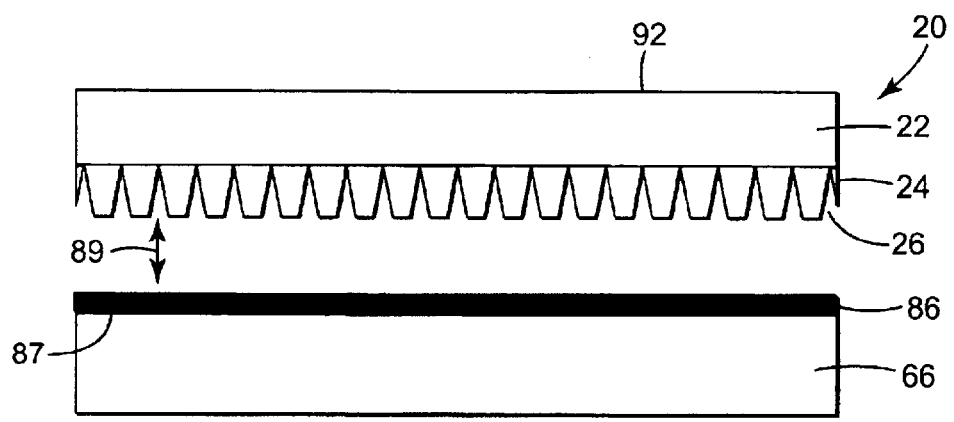
FIG. 6 is a side elevation diagram of a step of a method for producing a structure using a composition of the present invention.

FIG. 6 illustrates an alternate method for forming shielded screen 60 which eliminates various steps and materials used in the methods of FIGS. 3 and 5. FIG. 6 is a side elevation diagram of a step of a second method. In one embodiment, microrib structure 20 is formed by the microreplication process 32 discussed above with respect to FIG. 3 to impart light diffusive ribs 24 having V-shaped grooves 26 onto base structure 22. An alternate process illustrated in FIG. 6 eliminates the planarization process 34 shown in FIG. 3 and the two-step lamination process shown in FIG. 5 by introducing a light absorbing adhesive 86 of the present invention which replaces both light absorbing material 28 and adhesive 64. By combining the light absorption and adhesive functions in one material, savings in materials and manufacturing steps are obtained. Light absorbing adhesive 86 is disposed on rear surface 87 of shield 66. Shield 66, with light absorbing adhesive 86 disposed thereon, is brought together with microrib structure 20. As shown by arrow 89, for example, shield 66 and microrib structure 20 are laminated together.

It is typically desirable for shielded screen 60 to be relatively rigid (see FIG. 5). Because thinner substrates 22 are typically used, rigid shields 66 are normally selected to yield a rigid shielded screen 60. However, rigid materials must be pre-sheeted and fed into the lamination process 68 shown in FIG. 5, making the process 68 semi-continuous and resulting in lower process rates. The process shown in FIG. 6 can use thicker but flexible substrates 22 and shields 66. This lamination of flexible substrates 22 and flexible shields 66 with light absorbing adhesive 86 into a rigid shielded screen can be achieved in a continuous process in excess of 20 feet per minute. After lamination, an in-line cutter can be used to sever the laminated product into individual rigid shielded screens.

As an example, a 1.27 mm (50 mil) composite shielded screen made by the process of FIG. 6 with a 0.508 mm (20 mil) substrate 22, a 0.254 mm (10 mil) layer of diffusive ribs

24 filled with light absorbing adhesive 86, and a 0.508 mm (20 mil) shield 66 is as stiff or stiffer than a multi-layer Toppan screen at 1.524 mm (60 mils) and is significantly stiffer than a DNP mono-layer screen at 1.27 mm (50 mils). The added stiffness is attributable to the adhesive nature of light absorbing adhesive 86.

In one exemplary embodiment, light absorbing adhesive 86 is a photopolymerizable, low refractive index material which adheres to both light diffusive ribs 24 and shield 66. In an exemplary embodiment, the refractive indices of light diffusive ribs 24 and light absorbing adhesive 86 differ enough to cause total reflection rather than transmittance at the interface therebetween. In an exemplary embodiment, the refractive index of the microrib material of light diffusive ribs 24 varies from 1.49 for simple acrylate materials to 1.58 or higher for materials such as aromatic polycarbonates. The refractive index requirement for the groove filler material 86 is, therefore, dependent on the optical properties (such as refractive index) of the microrib 24 material. For the high refractive index microrib materials, such as polycarbonate, commercially available photolaminating adhesives may be adequate. Exemplary adhesives 86 have a RI of less than about 1.50. Particularly suitable adhesives 86 have a RI of less than about 1.45.

In some embodiments, adhesive 86 is a pigmented blend of one or more of the following components: urethane acrylate oligomers; substituted acrylate, diacrylate and triacrylate monomers; fluorinated acrylates including perfluoroalkylsulfonamidoalkyl acrylates; fluorinated acrylamides; acrylated silicones; acrylated silicone polyureas and UV or visible light activated photoinitiators. Perfluoroalkylsulfonamidoalkyl acrylates are particularly useful due to low RI and good mechanical properties. Suitable components are described in U.S. Patent Application Publications Nos. U.S. 2003/0139549 and U.S. 2003/0139550; both incorporated herein by reference; both by Patricia M. Savu et al.; both entitled "Fluorochemical Sulfonamide Surfactants;" filed on Oct. 4, 2002 and Dec. 5, 2002, respectively; and both published on Jul. 24, 2003.

If the viscosity of the groove filler 86 is too low, it will flow during the groove filling process. This can waste material, give nonuniform thickness, and contaminate the process equipment. If the viscosity is too high, filling the grooves 24 can be a slow, difficult process and the possibility of introducing bubbles (optical defects) increases significantly. While photolamination can be accomplished with fluids having viscosities as low as about 150 centipoises, many processes can benefit from a viscosity of at least about 400 centipoises before polymerization. While viscosities as high as about 5,000 centipoises before polymerization can be used, viscosities no higher than about 1,500 centipoises before polymerization are especially suitable for reasonable process speed and bubble-free coatings.

A standard measure of adhesion between substrates and coatings is the amount of force required to separate them, known as the peel force. The peel force of a system containing excellent interfacial adhesion at the interface between layers will be very high. While peel force strength of at least about 35.7 kg/m (2 pounds/inch) is probably adequate between diffusive ribs 24 and light absorbing adhesive 86, it is more desirable to have peel force of at least about 71.4 kg/m (4 pounds/inch). This high peel force should be maintained under environmental test conditions of high temperature and humidity. Adequate adhesion may be achieved by modification of the substrate surfaces by treatment, such as with corona discharge (including nitrogen or air corona treatments), plasma, priming, or using a tie layer. It is preferred, however, that the adhesive 86 adhere to the light diffusive ribs 24 and shield 66, if used, without the necessity of surface modification.

One suitable embodiment of light absorbing adhesive 86 is constructed by warming the following resin components to about 70° C. (158° F.) to lower the viscosity sufficiently to allow for agitation: 16.0 g aliphatic urethane acrylate oligomer; 19.0 g ethoxyethoxyethyl acrylate; 5.5 g hexanediol diacrylate; 5.0 g tetrahydrofurfuryl acrylate; 44.5 g N-methyl-perfluorobutylsulfonamidoethyl acrylate; 10.0 g acryloyloxyethoxyperfluorobutane; and 1.0 g phenyl bis(2, 4,6 trimethyl benzoyl) phosphine oxide photoinitiator.

The components are then shaken until a clear solution results. The solution is then pigmented for light absorption. One suitable pigment is carbon black; in one embodiment, the pigment is used in a concentration between about 50 ppm and about 20,000 ppm; in one exemplary embodiment, the pigment is used in a concentration greater than about 1000 ppm and less than about 9000 ppm. A concentration of about 3000 ppm is particularly suitable, based on mass ratios of the carbon black material to the resin material. In one embodiment, the formulation is disposed onto shield 66 by a conventional method such as knife coating. The coated shield is then pressed onto microrib structure 20 as shown in FIG. 6, for example, to partially or completely fill grooves 26. Excess adhesive 86, if any, is expelled by running a rubber roller over the construction. The construction is passed under a 11.81 W/mm (300 Watt/in). Fusion Systems D lamp one or more times at about 6.1 m (20 feet) per minute. In an alternate method, the formulation may be coated directly onto the microrib structure 20, and shield 66 then adhered to the microrib structure 20 with adhesive 86 already disposed thereon. Thereafter, the steps of removing excess adhesive 86 and curing the construction are the same as discussed above.

Figure 7A:
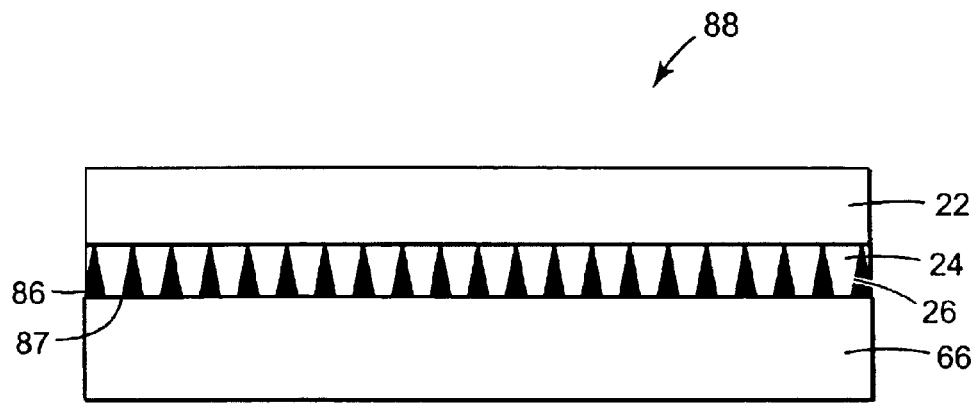
FIG. 7A is a side elevation view of one embodiment of a screen produced by the method of FIG. 6.

FIG. 7A is a side elevation view of one embodiment of a screen produced by the method of FIG. 6. The step of FIG. 6 can result in a completely filled structure illustrated at FIG. 7A. In one exemplary embodiment, light absorbing adhesive 86 has a low refractive index to produce efficient TIR within ribs 24. Light absorbing adhesive 86 is formulated to effectively bond diffuser ribs 24 to shield 66. Light absorbing adhesive 86 can possess low shrinkage properties to produce a cosmetically acceptable lamination result. Moreover, it is particularly suited that light absorbing adhesive 86 is curable by ultraviolet light in order to allow for convenient processing and a fast cure.

In one embodiment, light diffusive ribs 24 are replicated from a tooling mold using a high refractive index diffuser resin, as shown in microreplication process 32 of FIG. 3. In this application, all percentages are by mass unless otherwise indicated. One suitable resin is about 79% aliphatic urethane acrylate oligomer, about 19% 2-phenoxyethyl acrylate, and about 2% 2-hydroxy-2-methyl-1-phenyl-1-propanone photoinitiator. Another suitable resin is about 69% aliphatic urethane acrylate oligomer, about 29% 2-(1-naphthyloxy)-ethyl acrylate, and about 2% 2-hydroxy-2-methyl-1-phenyl-1-propanone photoinitiator. The resin for forming ribs 24 is coated from resin coating station 38 onto substrate or base structure 22. Base structure 22 with resin thereon is molded by microstructured cylinder 42 and cured by ultraviolet (UV) lamps or electron beams 44. Typical UV cure conditions use a 23.62 W/mm (600 Watt/in) Fusion Systems D bulb system, operated at belt speeds of about 3.05 m (10 feet) to about 6.10 m (20 feet) per minute, with one or more passes under the UV bulb. The formed microrib structure 20 is removed from microreplication process 32, yielding a self-supporting structure.

Then, a pigmented, typically black, light absorbing adhesive 86 is applied to a second substrate such as shield 66. One suitable light absorbing adhesive 86 is formed from a resin having about 30% "Formulation A," (the "Formulation A" having about 38.5% aliphatic urethane acrylate oligomer; about 26.9% ethoxyethoxyethyl acrylate; about 28.8% isobornyl acrylate; about 5.8% hexanediol diacrylate; and about 1% α,α-diethoxyacetophenone (DEAP) photoinitiator); about 10% aliphatic urethane diacrylate; about 30% trifluoroethyl acrylate; and about 30% N-methyl-perfluorobutylsulfonamidoethyl acrylate. Another suitable light absorbing material 86 is formed from a resin having about 50% "Formulation A," discussed above, and about 50% N-methyl-perfluorobutylsulfonamidoethyl acrylate. In one exemplary embodiment, light absorbing adhesive 86 contains a pigment such as carbon black. In one embodiment, the pigment is used in a concentration between about 50 ppm (parts per million) and about 20,000 ppm. In one exemplary embodiment, the pigment is used in a concentration greater than about 1,000 ppm and less than about 9,000 ppm. A concentration of about 3,000 ppm is particularly suitable, based on mass ratios of the carbon black material to the adhesive material.

Light absorbing adhesive 86 can be applied to a second substrate such as shield 66 in sufficient quantity to completely fill diffuser ribs 24, allowing a slight excess to ensure complete fill, in the lamination method illustrated in FIG. 6. The excess adhesive squeezes out of completely filled structure 88 upon lamination. Completely filled structure 88 is then exposed to radiation under conditions similar to those discussed above for microreplication process 32. The exposure can, for example, result in a partial or complete polymerization of the material. After at least partial polymerization, light absorbing adhesive 86 is a copolymer of its components.

Figure 7B:
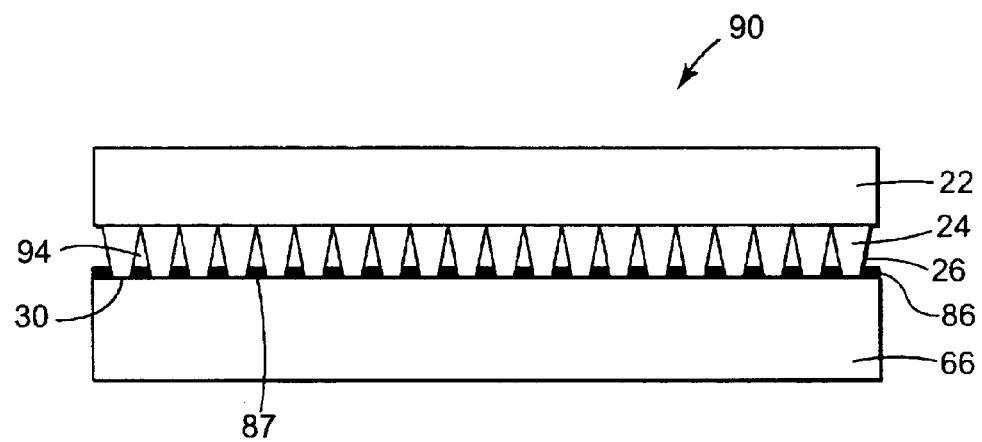
FIG. 7B is a side elevation view of a second embodiment of a screen produced by the method of FIG. 6.

FIG. 7B is a side elevation view of another embodiment of a screen produced by the method of FIG. 6. When a small thickness or amount of light absorbing adhesive 86 is used in the step illustrated in FIG. 6, partially filled structure 90 results. In partially filled structure 90, air gaps 94 are left in V-shaped grooves 26. A benefit of air gap 94 is that low refractive index air fills the rib grooves 26 and creates a large refractive index difference between the grooves 26 and the light diffusive ribs 24, further enhancing "TIR efficiency." Because the refractive index of air is 1.0, the difference in refractive index between air gap 94 and light diffusive ribs 24 is usually greater than about 0.5. Because air gap 94 creates the bulk of the diffuser rib interface, light absorbing adhesive 86 need not possess as low a refractive index as when the ribs are completely filled in structure 88. This allows for the selection of an adhesive 86 to optimize other important properties, such as low shrinkage and high peel strength adhesion, for example. Since the adhesive contact area between light absorbing adhesive 86 and diffuser ribs 24 is smaller, light absorbing adhesive 86 may possess greater adhesion properties in partially filled structure 90 than completely filled structure 88.

In both completely filled structure 88 and partially filled structure 90, the level of light absorbing material used in light absorbing adhesive 86 is chosen based on the desired amount of contrast enhancement and ambient light absorption. The light absorbing material in an exemplary embodiment is a black pigment such as carbon black. In completely filled structure 88, the black pigment concentration can be relatively low and yet yield an acceptable total fixed absorbence, or optical density value, because the thickness of the layer of light absorbing adhesive 86 is large. A suitable loading concentration of pigment such as carbon black in completely filled structure 88 in one embodiment is between about 50 ppm (parts per million) and about 20,000 ppm. In an exemplary embodiment, the concentration is greater than about 1000 ppm and less than about 9000 ppm. A concentration of about 3000 ppm is particularly suitable, based on mass ratios of the carbon black material to the adhesive material. However, in partially filled structure 90, the coating thickness is small; therefore, the black pigment concentration must be larger to yield the same optical density. In the latter case, the ambient light absorption is larger per unit of coating thickness than in the former case. A suitable loading concentration of pigment such as carbon black in partially filled structure 90 in one embodiment is between about 50 ppm and about 20,000 ppm. In an exemplary embodiment, the concentration is greater than about 5,000 ppm and less than about 10,000 ppm, based on mass ratios of the carbon black material to the adhesive material.

A challenge in both completely filled structure 88 and partially filled structure 90 is the removal of excess adhesive 86 from front surface 30 of diffuser ribs 24 during lamination. If all of the light absorbing adhesive 86 is not removed from front surface 30 of the diffuser ribs 24 during lamination, some image light can be lost due to absorption during TIR transmission. In a partially filled structure 90 with more highly pigmented adhesive 86, more loss of image light can occur for the same residual black layer thickness.

Figure 8:
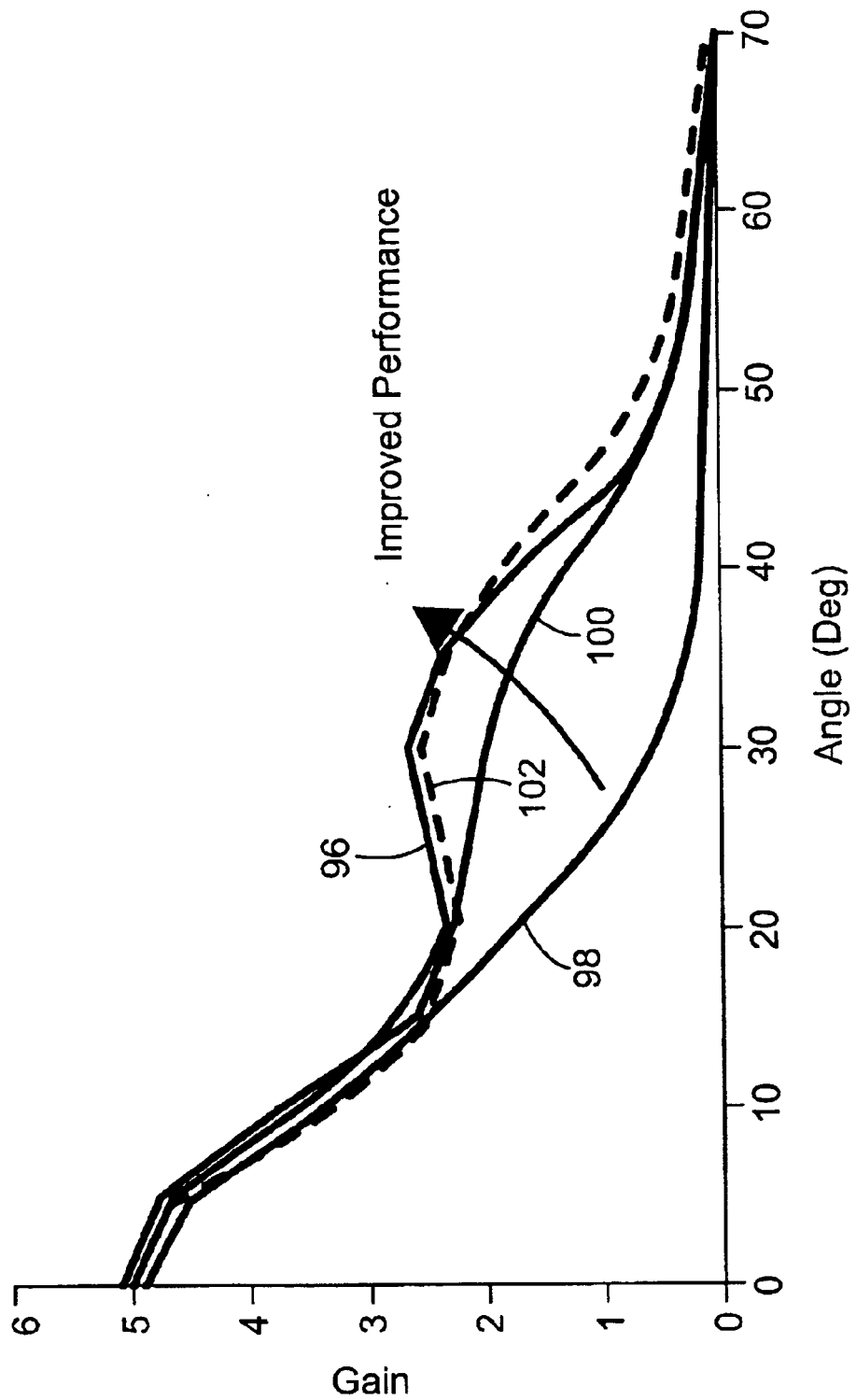
FIG. 8 is a graph illustrating screen performance based on a variety of black adhesive composition formulations of the present invention.

FIG. 8 is a graph illustrating screen performance based on a variety of black adhesive formulations. One way of gauging screen performance is by plotting the horizontal gain curve as a function of viewing angle. The plotted curves describe the brightness of the screen perceived by a viewer as the viewer moves sideways away from the center of the screen. "TIR efficiency" relates to the range of incident light angles that result in total internal reflection; the greater the range, the higher the efficiency. TIR efficiency increases as the difference in refractive index increases between light absorbing adhesive 86 and diffusive ribs 24. Reflection from the rib 24 sides can produce a local maximum in the gain curve as shown. As both the TIR efficiency and RI difference increase, the secondary peak in the gain curve (near 30 degrees horizontal viewing angle) can increase. The effect of a local maximum can be reduced or eliminated by, for example, introducing light diffusion into the projection screen. For example, ribs 24 may include particles to make the local maximum less pronounced by scattering any incident light.

Curve 96 refers to a benchmark standard screen of construction illustrated in FIG. 4. The benchmark standard screen has light diffusive ribs 24 formed from a resin having about 80% aliphatic urethane acrylate oligomer and about 20% 2-phenoxyethyl acrylate. Light diffusive ribs 24 have a refractive index of about 1.51. Light absorbing material 28 is formed from a resin having about 60% proprietary RC709 silicone acrylate from Goldschmidt Corp., about 39% propoxylated neopentyl glycol diacrylate, and about 1% Darocur 4265 (a 1:1 blend of 2-hydroxy-2-methyl-1-phenyl-1-propanone and diphenyl (2,4,6-trimethylbenzoyl)-phosphine oxide) photoinitiator with carbon black pigment in a concentration of about 3,000 ppm. Light absorbing material 28 has a refractive index of about 1.45. The RI difference between light absorbing material 28 and light diffusive ribs 24 is about 0.06. This formulation of light absorbing material 28 possesses low shrinkage characteristics, good processing properties, uniform dispersion of the black pigment, low price and widespread availability.

Curve 98 refers to a screen formed by the method illustrated in FIGS. 6 and 7A which shows the gain when the RI difference between diffuser ribs 24 and light absorbing adhesive 86 is less than about 0.01. The screen corresponding to curve 98 has light diffusive ribs 24 formed from a resin having about 80% aliphatic urethane acrylate oligomer and about 20% 2-phenoxyethyl acrylate. Light diffusive ribs 24 have a refractive index of about 1.51. Light absorbing material 28 is formed from a "Formulation A" resin having about 38.5% aliphatic urethane acrylate oligomer; about 26.9% ethoxyethoxyethyl acrylate; about 28.8% isobornyl acrylate; about 5.8% hexanediol diacrylate; and less than about 1% α,α-diethoxyacetophenone (DEAP) photoinitiator. Light absorbing material 28 has a refractive index of about 1.50.

Curve 100 refers to a screen formed by the method illustrated in FIGS. 6 and 7A which has increased "TIR efficiency" when a light absorbing adhesive 86 with relatively low RI is used. The screen corresponding to curve 100 has light diffusive ribs 24 formed from a resin having about 80% aliphatic urethane acrylate oligomer and about 20% 2-phenoxyethyl acrylate. Light diffusive ribs 24 have a refractive index of about 1.51. Light absorbing material 28 is formed from a resin having about 30% "Formulation A," discussed above; about 10% aliphatic urethane diacrylate; about 30% trifluoroethyl acrylate; about 30% N-methyl-perfluorobutylsulfonamidoethyl acrylate; and about 1% α,α-diethoxyacetophenone (DEAP) photoinitiator. Light absorbing material 28 has a refractive index of about 1.44.

Finally, curve 102 refers to a screen formed by the method illustrated in FIGS. 6 and 7A, in which the TIR efficiency is increased, where the RI difference between light absorbing adhesive 86 and light diffusive ribs 24 is about 0.08. The screen corresponding to curve 102 has light diffusive ribs 24 formed from a resin having about 70% aliphatic urethane acrylate oligomer and about 30% 2-(1-naphthyloxy)-ethyl acrylate. Light diffusive ribs 24 have a refractive index of about 1.53. Light absorbing material 28 is formed from a resin having about 50% "Formulation A," discussed above; about 50% N-methyl-perfluorobutylsulfonamidoethyl acrylate; and about 1% α,α-diethoxyacetophenone (DEAP) photoinitiator. Light absorbing material 28 has a refractive index of about 1.45.

As shown in FIG. 8, the formulation of light absorbing adhesive 86 relative to the formulation of light diffusive ribs 24 can be chosen to produce the desired screen performance characteristics. Usually, the formulations are chosen to maximize the RI difference between light absorbing adhesive 86 and light diffusive ribs 24. It is desirable for light absorbing adhesive 86 to achieve strong adhesion to light diffusive ribs 24 and protective shield 66, possess a relatively low RI, have high mechanical strength after curing, and processability properties such as appropriate viscosity and curability by ultraviolet light. A suitable component of light absorbing material 86 is an aliphatic urethane acrylate oligomer. In some embodiments, light absorbing adhesive 86 contains at least about 5 percent of an aliphatic urethane acrylate oligomer. In an exemplary embodiment, light absorbing adhesive 86 contains at least about 10 percent of an aliphatic urethane acrylate oligomer. In some embodiments, light absorbing adhesive 86 contains less than about 50 percent of an aliphatic urethane acrylate oligomer. In an exemplary embodiment, light absorbing adhesive 86 contains less than about 40 percent of an aliphatic urethane acrylate oligomer. If the concentration of aliphatic urethane acrylate oligomer is too low, light absorbing adhesive 86 may not be viscous enough; if the concentration is too high, light absorbing adhesive 86 may be too viscous, and the refractive index may be too high.

Another suitable component of light absorbing material 86 is a low RI compatible acrylate monomer, of which ethoxyethoxyethyl acrylate is an example. In some embodiments, light absorbing adhesive 86 contains at least about 1 percent of an acrylate monomer. In an exemplary embodiment, light absorbing adhesive 86 contains at least about 8 percent of an acrylate monomer. In some embodiments, light absorbing adhesive 86 contains less than about 30 percent of an acrylate monomer. In an exemplary embodiment, light absorbing adhesive 86 contains less than about 20 percent of an acrylate monomer. In an exemplary embodiment, the acrylate monomer has a relatively low RI and serves as a solvent to enhance the compatibility of the other components of light absorbing adhesive 86. Other suitable acrylate monomers include, for example, fluorinated acrylates such as trifluoroethyl acrylate, perfluoroalkanoamidoalkyl acrylate and perfluorobutyramidoethyl acrylate.

Another suitable component of light absorbing material 86 is a multifunctional acrylate monomer to add strength, of which hexanediol diacrylate is an example. In some embodiments, light absorbing adhesive 86 contains at least about 0.1 percent of a multifunctional acrylate monomer. In an exemplary embodiment, light absorbing adhesive 86 contains at least about 1.0 percent of a multifunctional acrylate monomer. In some embodiments, light absorbing adhesive 86 contains less than about 10 percent of a multifunctional acrylate monomer. In an exemplary embodiment, light absorbing adhesive 86 contains less than about 6 percent of a multifunctional acrylate monomer. The higher the functionality of the multifunctional acrylate monomer, the lower the required concentration.

The screen with "Formulation A" light absorbing adhesive 86, illustrated by curve 98, has too high a RI to provide efficient TIR. One compatible component for decreasing the RI of light absorbing adhesive 86 is a perfluoroalkylsulfonamidoethyl acrylate, of which N-methyl-perfluorobutylsulfonamidoethyl acrylate is an example. In some embodiments, light absorbing adhesive 86 contains at least about 1 percent of a perfluoroalkylsulfonamidoethyl acrylate. In an exemplary embodiment, light absorbing adhesive 86 contains at least about 10 percent of a perfluoroalkylsulfonamidoethyl acrylate. In some embodiments, light absorbing adhesive 86 contains less than about 70 percent of a perfluoroalkylsulfonamidoethyl acrylate. In an exemplary embodiment, light absorbing adhesive 86 contains less than about 50 percent of a perfluoroalkylsulfonamidoethyl acrylate.

Where light absorbing material 86 is photopolymerized, a suitable photoinitiator is included; phenyl bis(2,4,6 trimethyl benzoyl) phosphine oxide photoinitiator and α,α-diethoxyacetophenone (DEAP) photoinitiator are examples of suitable free radical photoinitiators. In some embodiments, light absorbing adhesive 86 contains at least about 0.5 percent of a photoinitiator. In an exemplary embodiment, light absorbing adhesive 86 contains about 1.0 percent of a photoinitiator. In some embodiments, light absorbing adhesive 86 contains less than about 5 percent of a photoinitiator. In other embodiments, a thermal polymerization initiator or redox initiator is chosen.

In yet another embodiment, light absorbing adhesive 86 contains about 54.4% amine terminated silicone polyurea (molecular weight 5,000 g/mole) reacted with isocyanatoethyl methacrylate; about 44.6% isobornyl acrylate; and about 1.0% phenyl bis(2,4,6 trimethyl benzoyl) phosphine oxide photoinitiator. This formulation is coated on cured acrylate diffusive ribs 24 on one side and laminated to a shield 66 of Dupont 617 primer polyester film on the other side. The layers are passed under a 23.62 W/mm (600 W/in) Fusion Systems D lamp four times at 15.24 m/minute (50 feet/minute). The 180 degree peel force measured at a peel rate of 127 mm/minute (5 inches/minute) by a model 3M90 slip/peel tester by Instrumentors, Inc. is about 73.2 kg/m (4.1 pounds/inch). The refractive index of the polymerized light absorbing adhesive formulation 86 is about 1.45.

Figure 9:
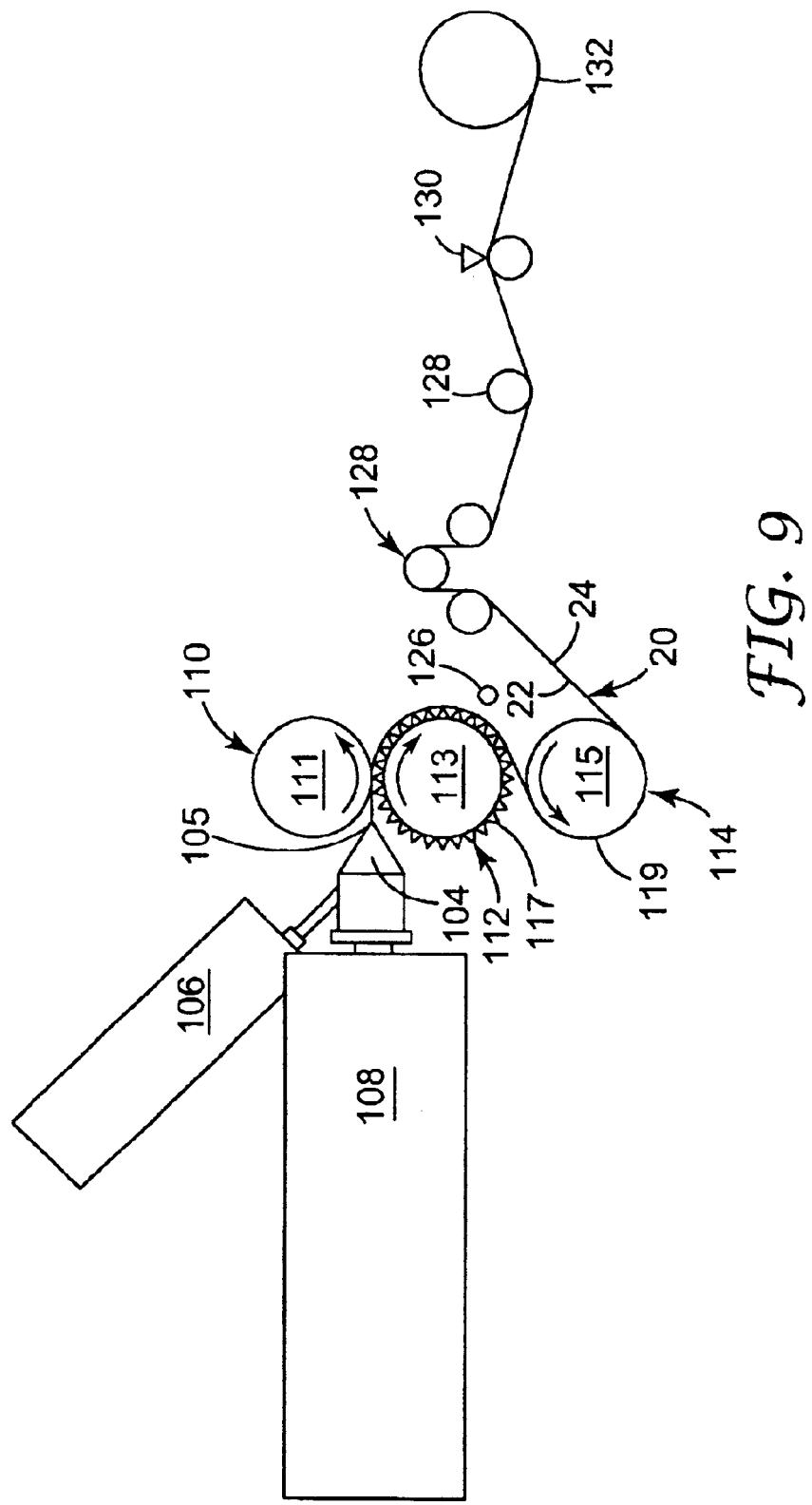
FIG. 9 illustrates yet another method by which a screen may be manufactured.

FIG. 9 illustrates yet another method by which a screen may be manufactured. FIG. 9 shows one example of a co-extrusion process that can be used to produce microrib structure 20 instead of the microreplication process 32 discussed with respect to FIG. 3. In one exemplary embodiment shown in FIG. 9, co-extrusion die 104 is a high-temperature, high-pressure die for the simultaneous extrusion of a two-layer film. In one embodiment, die 104 has an extruder orifice diameter 105 of about 44.4 mm (1.75 inch) to about 50.8 mm (2 inches). The two-layer film is composed of material 106 to form base substrate 22 and material 108 to form light diffusive ribs 24. In one embodiment, materials 106 and 108 are heated to about 66° C. (150° F.) and extruded from die 104, which has a temperature of about 293° C. (560° F.). Each material 106 and 108 is isolated from the other until after they are extruded from die 104. After extrusion, the materials 106 and 108 are brought into contact with each other, wherein at least material 108 is still in a molten state.

The three-roll extrude-emboss technique shown in FIG. 9 uses a first roll 110, a patterned second roll 112, and a third roll 114. In one embodiment, each roll 110, 112 and 114 is about 0.43 m (17 inches) in diameter. First roll 110 and third roll 114 may be heated or chilled as required by the nature of the materials used to facilitate release of the materials from the roll surfaces. Materials 106 and 108 are simultaneously extruded from die 104 onto patterned roll 112. In the illustrated embodiment, material 106 is extruded proximate nip roll 110 and material 108 is extruded proximate patterned cast roll 112. In one embodiment, first or nip roll 110 is heated to greater than or about 52° C. (125° F.) by running heated oil through interior 111 of roll 110, the oil being heated by an external heat source. In one exemplary embodiment, nip roll 110 is formed of a material such as silicone rubber.

Cast roll 112 is patterned on outer surface 117 to impart the desired structures upon material 108 to result in light diffusive ribs 24. In one exemplary embodiment, cast roll 112 is formed of a metal such as chromium, nickel, titanium, or an alloy thereof. In one embodiment, cast roll 112 is heated to greater than or about 204° C. (400° F.), more particularly between about 252° C. (485° F.) and about 282° C. (540° F.), by running heated oil through interior 113 of roll 112, the oil being heated by an external heat source. Third or carrier roll 114 is generally heated or chilled by running oil or water through interior 115 of roll 114 to assist in the release of microrib structure 20 from cast roll 112. In one embodiment, carrier roll 114 is heated to greater than or about 66° C. (150° F.) by running heated oil through the interior 115 of roll 114, the oil being heated by an external heat source. In one exemplary embodiment, carrier roll 114 has a smooth outer surface 119 and is formed of a metal such as chromium, nickel, titanium, or an alloy thereof.

In one embodiment, material 106 for forming base structure 22 is a light transmitting material such as a clear polymer such as polycarbonate, polyester, polyolefin, polypropylene, acrylic or vinyl, for example. In one embodiment, material 108 for diffuser ribs 24 is a high refractive index polymer such as a modified acrylic, polycarbonate, polystyrene, polyester, polyolefin, polypropylene, or other optical polymer. It is particularly suitable for material 108 to have a refractive index greater than or equal to about 1.50. Polycarbonate, with a RI of 1.59 is particularly useful due to its high Tg, clarity and mechanical properties. In one embodiment, material 106 and material 108 are compatible so that they physically bond at the interface therebetween to integrate into a monolithic structure. This is achieved in one exemplary embodiment by using the same polymer material for material 106 and 108, the difference being that material 108 incorporates light diffusing particles into the polymer. In an alternate embodiment, material 106 and material 108 can have different compositions, but they possess similar processing characteristics and bond to one another at their interface.

In one embodiment, nip roll 100 and cast roll 112 are in intimate contact to provide high pressure onto materials 106 and 108 against cast roll 112. This is especially important for materials with a high Tg such as polycarbonate, which set up almost immediately upon exiting die 104. Carrier roll 114 need not be in intimate contact with cast roll 112; the purpose of carrier or pull roll 114 is merely to take formed microrib structure 20 off cast roll 112. In one embodiment, each roll 110, 112 and 114 rotates at about 3.6 m (12 feet) per minute, with adjacent rolls rotating in opposite directions.

In one embodiment, air bar 126 facilitates the release of structure 20 off cast roll 112. Air bar 126 is a perforated cylinder which emits cooling air onto structure 20 just before the point of separation of structure 20 from cast roll 112. In one embodiment, air is supplied at 620 kPa (90 psi) and ambient temperature. Materials 106 and 108 solidify into structure 20. In one embodiment, tensioning roll assembly 128 is used to provide the proper amount of tension on structure 20 as it travels. Slitter 130 is provided to cut structure 20 to desired widths. Windup roll 132 winds up structure 20 for storage or later retrieval.

Other cast-emboss and extrude-emboss methods, for example, can also be used. The resulting microrib structure 20 can then be used in the method described with reference to FIGS. 6, 7A and 7B. In another embodiment, single layer extrusion can be used to extrude material 108 for forming light diffusive ribs 24 onto a previously formed substrate 22. In this embodiment, an input feeds substrate 22 so that material 108 in a molten state is extruded thereon and both materials are pressed together by nip roll 10 so that material 108 is patterned by cast roll 112. Substrate 22 and material 108 remain in intimate contact during the cooling phase.

Referring back to FIG. 6, co-extrusion can also be used to extrude the dual layer of shield 66 and light absorbing adhesive 86. Suitable materials for light absorbing adhesive 86 include those discussed with reference to FIG. 8, for example. In another exemplary embodiment, microrib structure 20 is filled with a black pigmented high melt flow PMMA light absorbing material 28 (see FIG. 2). In one exemplary embodiment, shield 66 is a clear PMMA. This construction yields a desirably high refractive index difference of about 0.08 to 0.09 between light absorbing material 28 and ribs 24.

Figure 10A:
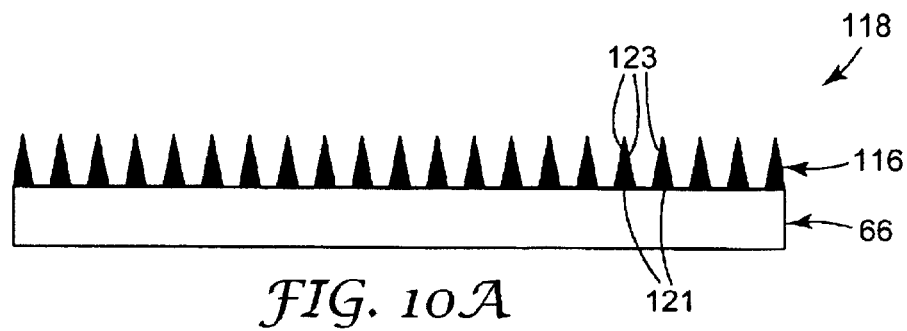
FIGS. 10A–10C illustrate steps for manufacturing a screen in another method.
Figure 10B:
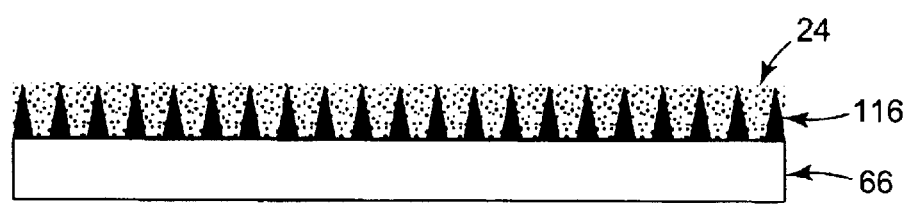
Figure 10C:
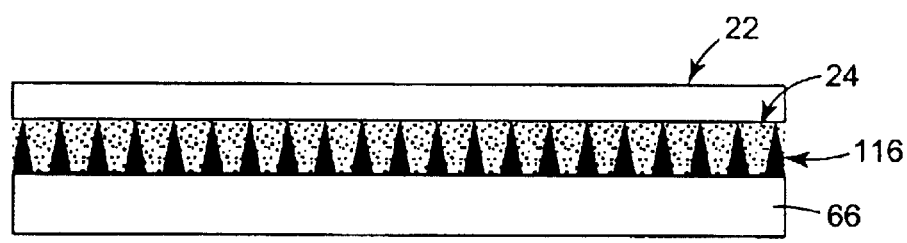

FIGS. 10A–10C illustrate steps for manufacturing a screen in a third method. In this embodiment, light absorbing ribs 116 are formed upon shield 66 by a microreplication process or co-extrusion. (See FIGS. 3 and 9 and related discussion). In an exemplary embodiment, ribs 116 form a plurality of cavities therebetween. In an exemplary embodiment, each rib 116 has a base 121 and a plurality of walls 123 which narrow the rib 116 as walls 123 extend from base 121. The cavities of structure 118 between ribs 116 can then be filled with a material with a high refractive index to form diffuser ribs 24. In an exemplary embodiment, the high refractive index material is discussed with respect to FIG. 1. Base substrate 22 can then be laid upon the filled structure to form a rear projection screen element.

Figure 10D:
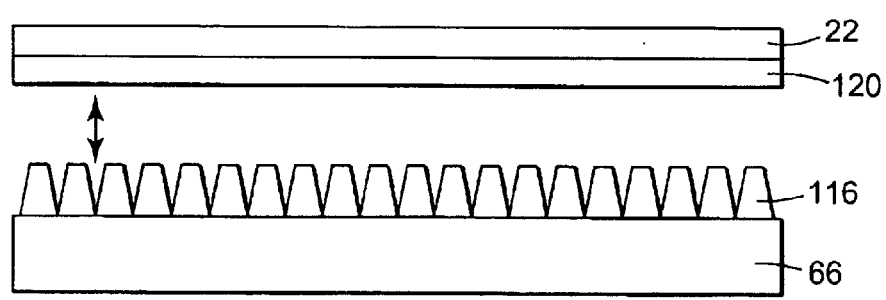
FIG. 10D illustrates an alternate step in a method for producing a rear projection screen element.

FIG. 10D illustrates an alternate step in a method for producing a rear projection screen element. A layer of high refractive index material 120 is provided adjacent base substrate 22 by a method such as coating or co-extrusion. The composite layer is laminated to structure 118 of FIG. 10A so that the high refractive index material of layer 120 fills the spaces between light absorbing ribs 116 to produce light diffusing ribs 24, ultimately resulting in the product shown in FIG. 10C.

Some advantages of the method illustrated in FIGS. 10A–10D include the ability to use a thinner base structure 22 because its strength is not as crucial in the process. A thinner base structure 22 will cause fewer optical effects and allow for reduced materials usage.

Figure 11:
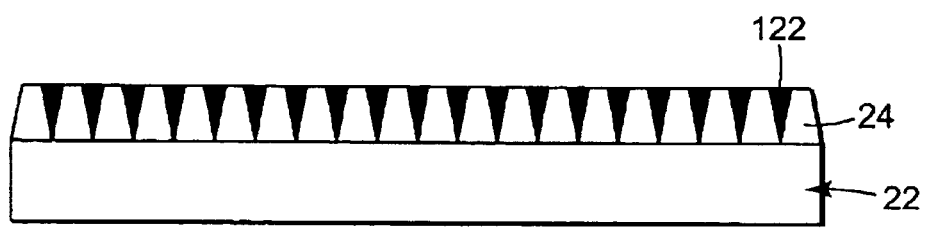
FIG. 11 illustrates a third embodiment of a rear projection screen.

FIG. 11 illustrates a third embodiment of a rear projection screen. In one embodiment, overcoat layer 122 is made of a material which is multifunctional to serve as a low refractive index component as well as a hard coat. In this way, the "TIR efficiency" is maintained, but the potential need to laminate to a protective shield is eliminated since the material of overcoat layer 22 is scratch-resistant due to its inherent hard properties. This combination of functions within one material further reduces material usage and costs. Suitable materials for overcoat layer 122 include hard coat materials incorporating a pigment such as carbon black. In one embodiment, the pigment is used in a concentration between about 50 ppm (parts per million) and about 20,000 ppm. In an exemplary embodiment, the concentration is greater than about 1,000 ppm and less than about 9,000 ppm. A concentration of about 3,000 ppm is particularly suitable, based on mass ratios of the carbon black material to the hard coat material.

One suitable hard coat material is disclosed in U.S. Pat. No. 5,104,929 to Bilkadi, hereby incorporated by reference. Bilkadi teaches a photocurable abrasion resistant coating including colloidal silicon dioxide particles dispersed in ethylenically unsaturated aliphatic and/or cycloaliphatic monomers that are substituted by a protic group. In particular, the coating composition curable to an abrasion and weather resistant coating includes a dispersion of colloidal silicon dioxide particles of diameters less than about 100 nanometers in a protic group-substituted ester or amide of acrylic or methacrylic acid.

Another suitable hard coat material is disclosed in U.S. Pat. No. 5,633,049 to Bilkadi, hereby incorporated by reference. Bilkadi teaches an acid- and abrasion-resistant coating prepared from a silica-free protective coating precursor composition including a multifunctional ethylenically unsaturated ester of acrylic acid, a multifunctional ethylenically unsaturated ester of methacrylic acid, or a combination thereof; and an acrylamide.

Other hard coat materials include room-temperature curing silicone resins derived from functionalized silane monomers; coatings derived from hydrolyzable silanes; polymers derived from a combination of acryloxy functional silanes and polyfunctional acrylate monomers; polymers such as acrylic with colloidal silica; and polymerized acrylate or methacrylate functionalities on a monomer, oligomer or resin; for example.

Figure 12:
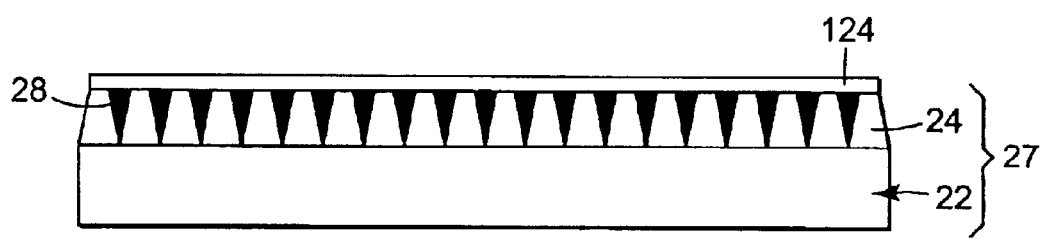
FIG. 12 is a side elevation view of a fourth embodiment of a rear projection screen.

FIG. 12 is a side elevation view of another embodiment of a rear projection screen. Embedded microstructured film 27 is provided with a hard coat 124 to protect the film against scratching and other damage. Hard coat 124 may be applied by spraying, dipping, or roll coating, for example. This process eliminates the need for a separate protective shield 66 and the lamination process illustrated in FIG. 5.

Although the present invention has been described with reference to exemplary embodiments, workers skilled in the art will recognize that changes may be made in form and detail without departing from the spirit and scope of the invention. For example, while particular shapes for light diffusive and light absorbing structures are illustrated, it is contemplated that the structures may be formed in different shapes, incorporating additional or different planes or angles, additional edges, and curved surfaces. It is further noted that the light diffusive structures on a particular substrate need not all be of the same height or shape, for example. Similarly, the light absorbing structures on a particular substrate need not all be of the same height or shape, for example. Moreover, components of the materials and processes described therein are combinable in numerous ways; only a few of those possibilities have been specifically described by way of example, although all are regarded to be within the scope of the invention.

For example, in a first embodiment, light diffusive ribs 24 are formed from an acrylated aliphatic urethane oligomer resin with an addition of about 0.1 pph (parts per hundred) to about 10 pph 2-hydroxy-2-methyl-1-phenyl-1-propanone photoinitiator; in an exemplary embodiment, about 2 pph photoinitiator is used. In a second embodiment, light diffusive ribs 24 are formed from an ethoxylated bisphenol A diacrylate resin with an addition of about 0.1 pph to about 10 pph 2-hydroxy-2-methyl-1-phenyl-1-propanone photoinitiator; in an exemplary embodiment, about 2 pph photoinitiator is used.

In a third embodiment, light diffusive ribs 24 are formed from a resin containing about 90% to about 95% acrylated aliphatic urethane oligomer and about 5% to about 10% ethoxylated bisphenol A diacrylate with an addition of about 0.1 pph to about 10 pph 2-hydroxy-2-methyl-1-phenyl-1-propanone photoinitiator; in an exemplary embodiment, about 2 pph photoinitiator is used. The acrylated aliphatic urethane oligomer possesses high strength properties while the ethoxylated bisphenol A diacrylate possesses desirable viscosity and RI characteristics.

In a fourth embodiment, light diffusive ribs 24 are formed from a resin containing about 20% to about 95% (more preferably about 50% to about 90%) ethoxylated bisphenol A diacrylate and about 5% to about 80% (more preferably about 10% to about 50%) acrylated epoxy oligomer with an addition of about 0.1 pph to about 10 pph 2-hydroxy-2-methyl-1-phenyl-1-propanone photoinitiator; in an exemplary embodiment, about 2 pph photoinitiator is used. The acrylated epoxy oligomer possesses desirable viscosity and RI characteristics.

In a fifth embodiment, light diffusive ribs 24 are formed from a resin containing about 10% to about 90% (more preferably about 25% to about 75%) acrylated aliphatic urethane oligomer and about 10% to about 90% (more preferably about 25% to about 75%) acrylated epoxy oligomer with an addition of about 0.1 pph to about 10 pph 2-hydroxy-2-methyl-1-phenyl-1-propanone photoinitiator; in an exemplary embodiment, about 2 pph photoinitiator is used.

In a sixth embodiment, light diffusive ribs 24 are formed from a resin containing about 10% to about 80% (more preferably about 20% to about 70%) acrylated aliphatic urethane oligomer; about 10% to about 70% (more preferably about 20% to about 60%) ethoxylated bisphenol A diacrylate and about 5% to about 65% (more preferably about 10% to about 50%) acrylated epoxy oligomer with an addition of about 0.1 pph to about 10 pph 2-hydroxy-2-methyl-1-phenyl-1-propanone photoinitiator; in an exemplary embodiment, about 2 pph photoinitiator is used.

In a seventh embodiment, light diffusive ribs 24 are formed from a resin containing about 30% to about 70% (more preferably about 50%) acrylated aliphatic urethane oligomer and about 30% to about 70% (more preferably about 50%) acrylated aromatic urethane oligomer with an addition of about 0.1 pph to about 10 pph 2-hydroxy-2-methyl-1-phenyl-1-propanone photoinitiator; in an exemplary embodiment, about 2 pph photoinitiator is used. The acrylated aromatic urethane oligomer possesses desirable viscosity and RI characteristics.

In an eighth embodiment, light diffusive ribs 24 are formed from a resin containing about 30% to about 90% (more preferably about 50% to about 75%) acrylated aliphatic urethane oligomer and about 10% to about 70% (more preferably about 25% to about 50%) 2-(1-naphthyloxy)-ethyl acrylate with an addition of about 0.1 pph to about 10 pph 2-hydroxy-2-methyl-1-phenyl-1-propanone photoinitiator; in an exemplary embodiment, about 2 pph photoinitiator is used.

In a ninth embodiment, light diffusive ribs 24 are formed from a resin containing about 40% to about 80% (more preferably about 60%) acrylated aliphatic urethane oligomer; about 10% to about 30% (more preferably about 20%) ethoxylated bisphenol A diacrylate and about 10% to about 30% (more preferably about 20%) 2-(1-naphthyloxy)-ethyl acrylate with an addition of about 0.1 pph to about 10 pph 2-hydroxy-2-methyl-1-phenyl-1-propanone-photoinitiator; in an exemplary embodiment, about 2 pph photoinitiator is used.

In a tenth embodiment, light diffusive ribs 24 are formed from a resin containing about 30% to about 70% (more preferably about 50%) acrylated aliphatic urethane oligomer; about 10% to about 40% (more preferably about 25%) acrylated epoxy oligomer and about 10% to about 40% (more preferably about 25%) 2-(1-naphthyloxy)-ethyl acrylate with an addition of about 0.1 pph to about 10 pph 2-hydroxy-2-methyl-1-phenyl-1-propanone photoinitiator; in an exemplary embodiment, about 2 pph photoinitiator is used.

In an eleventh embodiment, light diffusive ribs 24 are formed from a resin containing about 30% to about 70% (more preferably about 50% to about 60%) acrylated aliphatic urethane oligomer; about 5% to about 30% (more preferably about 6% to about 15%) ethoxylated bisphenol A diacrylate; about 5% to about 40% (more preferably about 15% to about 30%) acrylated epoxy oligomer; and about 5% to about 45% (more preferably about 15% to about 35%) 2-(1-naphthyloxy)-ethyl acrylate with an addition of about 0.1 pph to about 10 pph 2-hydroxy-2-methyl-1-phenyl-1-propanone photoinitiator; in an exemplary embodiment, about 2 pph photoinitiator is used.

In a twelfth embodiment, light diffusive ribs 24 are formed from a resin containing about 30% to about 90% (more preferably about 50% to about 80%) acrylated aliphatic urethane oligomer; about 5% to about 25% (more preferably about 6.7% to about 16.7%) ethoxylated bisphenol A diacrylate; and about 5% to about 45% (more preferably about 10% to about 33.3%) 2(2,4,6-tribromophenoxy) ethyl acrylate with an addition of about 0.1 pph to about 10 pph 2-hydroxy-2-methyl-1-phenyl-1-propanone photoinitiator; in an exemplary embodiment, about 2 pph photoinitiator is used. The 2(2,4,6-tribromophenoxy)ethyl acrylate increases the RI of the resin.

In a thirteenth embodiment, light diffusive ribs 24 are formed from a resin containing about 30% to about 90% (more preferably about 50% to about 70%) acrylated aliphatic urethane oligomer; about 5% to about 20% (more preferably about 6% to about 13.3%) ethoxylated bisphenol A diacrylate; about 5% to about 35% (more preferably about 10% to about 25%) 2-(1-naphthyloxy)-ethyl acrylate; and about 5% to about 35% (more preferably about 10% to about 26.7%) 2(2,4,6-tribromophenoxy)ethyl acrylate with an addition of about 0.1 pph to about 10 pph 2-hydroxy-2-methyl-1-phenyl-1-propanone photoinitiator; in an exemplary embodiment, about 2 pph photoinitiator is used.

In a fourteenth embodiment, light diffusive ribs 24 are formed from a resin containing about 30% to about 70% (more preferably about 50%) acrylated aliphatic urethane oligomer; about 5% to about 35% (more preferably about 16.7% to about 25%) ethoxylated bisphenol A diacrylate; and about 10% to about 45% (more preferably about 25% to about 33.3%) other RI modification materials (such as 2,2-bis(3,5-dibromo-4(acryloyloxy-2-hydroxypropoxy) phenyl)propane; 2,4-dibromo-6-sec-butyl-phenyl acrylate; 2-(naphthalen-2-ylsulfonyl)-ethyl acrylate; and polystyrene macromers, for example) with an addition of about 0.1 pph to about 10 pph 2-hydroxy-2-methyl-1-phenyl-1-propanone photoinitiator; in an exemplary embodiment, about 2 pph photoinitiator is used.

In a fifteenth embodiment, light diffusive ribs 24 are formed from a resin containing about 30% to about 70% (more preferably about 40% to about 50%) acrylated aliphatic urethane oligomer; about 15% to about 45% (more preferably about 25% to about 33.3%) 2-(1-naphthyloxy)-ethyl acrylate; and about 5% to about 45% (more preferably about 16.7% to about 30%) other RI modification materials with an addition of about 0.1 pph to about 10 pph 2-hydroxy-2-methyl-1phenyl-1-propanone photoinitiator; in an exemplary embodiment, about 2 pph photoinitiator is used.

In a sixteenth embodiment, light diffusive ribs 24 are formed from a resin containing about 40% to about 75% (more preferably about 60%) acrylated aliphatic urethane oligomer; about 5% to about 15% (more preferably about 6.7%) ethoxylated bisphenol A diacrylate; about 10% to about 30% (more preferably about 20%) 2-(1-naphthyloxy)-ethyl acrylate; and about 5% to about 30% (more preferably about 13.3%) other RI modification materials with an addition of about 0.1 pph to about 10 pph 2-hydroxy-2-methyl-1-phenyl-1-propanone photoinitiator; in an exemplary embodiment, about 2 pph photoinitiator is used.

In a seventeenth embodiment, light diffusive ribs 24 are formed from a resin containing about 40% to about 75% (more preferably about 60%) acrylated aliphatic urethane oligomer; about 5% to about 15% (more preferably about 5.5% to about 6.7%) ethoxylated bisphenol A diacrylate; about 5% to about 25% (more preferably about 13.3% to about 15%) 2(2,4,6-tribromophenoxy)ethyl acrylate; and about 10% to about 30% (more preferably about 20%) other RI modification materials with an addition of about 0.1 pph to about 10 pph 2-hydroxy-2-methyl-1-phenyl-1-propanone photoinitiator; in an exemplary embodiment, about 2 pph photoinitiator is used.

The loading of the light scattering particles within the resin for forming light diffusive ribs 24 is chosen to control optical properties such as gain and view angle of the screen. In an exemplary embodiment, the light scattering particles are loaded in the resin in a concentration of about 0.5% to about 30%, more preferably about 2% to about 20%, and even more preferably about 4% to about 15%. In an exemplary embodiment, the light scattering particles preferably have a higher RI than the resin in which the particles are dispersed. Generally, as the RI of the resin increases, the loading of the light scattering particles must also increase to maintain a given peak gain value. Moreover, as the surface texture of the back surface of the base substrate 22 becomes less matte, the loading of the light scattering particles must also generally increase to maintain a given peak gain value. Suitable materials for the light scattering particles include a copolymer of ethyl methacrylate and polystyrene; a copolymer of methyl methacrylate and polystyrene; and polystyrene, for example.

What is claimed is:

1. A composition comprising:
    at least about 10 percent perfluoroalkylsulfonamideoethyl acrylate;
    at least about 5 percent aliphatic urethane acrylate oligomer;
    at least about 1 percent acrylate monomer; and
    less than about 84 percent other reactive and non-reactive components.

2. The composition of claim 1 in which the acrylate monomer includes multifunctional acrylate monomer in a concentration of at least about 0.1 percent of the composition.

3. The composition of claim 2 comprising at least about 1.0 percent multifunctional acrylate monomer.

4. The composition of claim 2 comprising less than about 10 percent of a multifunctional acrylate monomer.

5. The composition of claim 2 comprising less than about 6 percent of a multifunctional acrylate monomer.

6. The composition of claim 2 in which the multifunctional acrylate monomer is hexanediol diacrylate.

7. The composition of claim 1 further comprising at least about 0.5 percent initiator.

8. The composition of claim 7 in which the initiator is a photoinitiator.

9. The composition of claim 8 comprising at least about 1.0 percent photoinitiator.

10. The composition of claim 8 comprising less than about 5 percent of a photoinitiator.

11. The composition of claim 8 in which the photoinitiator is a free radical photoinitiator.

12. The composition of claim 11 in which the photoinitiator is phenyl bis(2,4,6-trimethyl benzoyl) phosphine oxide photoinitiator.

13. The composition of claim 11 in which the photoinitiator is α,α-diethoxyacetophenone photoinitiator.

14. The composition of claim 1 comprising less than about 70 percent of a perfluoroalkylsulfonamideoethyl acrylate.

15. The composition of claim 14 comprising less than about 50 percent of a perfluoroalkylsulfonamideoethyl acrylate.

16. The composition of claim 1 in which the perfluoroalkylsulfonamideoethyl acrylate is N-methyl-perfluorobutylsulfonamidoethyl acrylate.

17. The composition of claim 1 comprising at least about 10 percent aliphatic urethane acrylate oligomer.

18. The composition of claim 1 comprising less than about 50 percent of an aliphatic urethane acrylate oligomer.

19. The composition of claim 1 comprising less than about 40 percent of an aliphatic urethane acrylate oligomer.

20. The composition of claim 1 comprising at least about 8 percent acrylate monomer.

21. The composition of claim 1 comprising less than about 30 percent of an acrylate monomer.

22. The composition of claim 1 comprising less than about 20 percent of an acrylate monomer.

23. The composition of claim 1 in which the acrylate monomer is ethoxyethoxyethyl acrylate.

24. The composition of claim 1 having a viscosity before polymerization of at least about 400 centipoises.

25. The composition of claim 1 having a viscosity before polymerization less than about 1,500 centipoises.

26. The composition of claim 1 further comprising a light absorbing pigment.

27. The composition of claim 26 in which the light absorbing pigment is carbon black.

28. The composition of claim 27 in which a concentration of carbon black is at least about 1000 ppm.

29. The composition of claim 27 in which a concentration of carbon black is about 3000 ppm.

30. The composition of claim 27 in which a concentration of carbon black is less than about 10,000 ppm.

31. A film comprising the composition of claim 1.

32. An optical material comprising a copolymer of at least perfluoroalkylsulfonamideoethyl acrylate, aliphatic urethane acrylate oligomer, and acrylate monomer.

33. The optical material of claim 32 having a refractive index less than about 1.50.

34. The optical material of claim 33 having a refractive index less than about 1.45.

35. The optical material of claim 32 having a peel force strength with polycarbonate of at least about 35.7 kg/m (2 pounds/inch).

36. The optical material of claim 32 having a peel force strength with polycarbonate of at least about 71.4 kg/m (4 pounds/inch).

37. A film for a screen comprising:
    a light transmitting substrate;
    a plurality of structures disposed on the substrate, the structures defining a plurality of cavities therebetween; and
    an adhesive at least partially filling the cavities, the adhesive comprising a copolymer of perfluoroalkylsulfonamideoethyl acrylate, aliphatic urethane acrylate oligomer, and acrylate monomer.

38. The film of claim 37 in which the acrylate monomer comprises a multifunctional acrylate monomer.

39. The film of claim 37 in which the copolymer comprises an initiator.

40. The film of claim 39 in which the initiator is a photoinitiator.

41. The film of claim 37 in which the plurality of structures have a first refractive index and the adhesive has a second refractive index, the second refractive index being less than the first refractive index.

42. The film of claim 38 in which a difference between the first refractive index and the second refractive index is at least about 0.06.

43. The film of claim 37 further comprising a shield laminated to the structures by the adhesive.

44. The film of claim 37 in which the adhesive completely fills the cavities.

45. The film of claim 37 in which each structure has a base and a plurality of walls which narrow the structure as the walls extend from the base.

46. The film of claim 45 in which each structure is a rib.

47. The film of claim 37 in which the light transmitting substrate comprises a first material and the plurality of structures comprise the first material and a plurality of light diffusing particles.

48. The film of claim 37 in which each structure is light diffusive.

49. The film of claim 37 in which the adhesive is light absorbing.

50. The film of claim 49 in which the adhesive includes a black pigment.

51. A method of forming a film comprising:
   providing a light transmitting substrate having a plurality of structures disposed thereon, the structures defining a plurality of cavities therebetween; and
   at least partially filling the cavities with an adhesive, the adhesive comprising:
      at least about 10 percent perfluoroalkylsulfonamideoethyl acrylate;
      at least about 5 percent aliphatic urethane acrylate oligomer; and
      at least about 1 percent acrylate monomer.

52. The method of claim 51 in which the acrylate monomer comprises multifunctional acrylate monomer in a concentration of at least about 0.1 percent of the adhesive.

53. The method of claim 52 in which the adhesive further comprises at least about 0.5 percent initiator.

54. The method of claim 53 in which the initiator is a photoinitiator.

55. The method of claim 51 in which the plurality of structures have a first refractive index and the adhesive has a second refractive index, the second refractive index being less than the first refractive index.

56. The method of claim 55 in which a difference between the first refractive index and the second refractive index is at least about 0.06.

57. The method of claim 51 further comprising laminating a shield to the structures with the adhesive.

58. The method of claim 51 in which the step of filling the cavities includes completely filling the cavities with the adhesive.

59. The method of claim 51 in which each structure is light diffusive.

60. The method of claim 51 in which the adhesive is light absorbing.

61. The method of claim 60 in which the adhesive includes a pigment.

62. A composition comprising:
   at least about 10 percent perfluoroalkylsulfonamidoalkyl acrylate;
   at least about 5 percent aliphatic urethane acrylate oligomer;
   at least about 1 percent acrylate monomer; and
   less than about 84 percent other reactive and non-reactive components.

63. The composition of claim 1 in which the acrylate monomer is perfluoroalkanoamidoalkyl acrylate.

* * * * *

UNITED STATES PATENT AND TRADEMARK OFFICE
CERTIFICATE OF CORRECTION

PATENT NO. : 7,050,227 B2 Page 1 of 1
APPLICATION NO. : 10/733479
DATED : May 23, 2006
INVENTOR(S) : Peter M. Olofson It is certified that error appears in the above-identified patent and that said Letters Patent is hereby corrected as shown below:

First Page, Col. 2 (Abstract), line 6, delete "addiction" and insert --addition--, therefor.

In Col. 1, line 12, delete "and Method" and insert --with Light--, therfor.

In Col. 3, line 36, delete "polypropylene;" and insert --polypropylene,--, therefor.

In Col. 7, line 27, after "diacrylate" and insert --,--.

In Col. 7, line 29, delete "acrylamides:" and insert --acrylamides;--, therefor.

In Col. 17, line 38, delete "propanone-photoinitiator;" and insert --propanone photoinitiator;--, therefor.

In Col. 18, line 43, delete "1phenyl-1-propanone" and insert --1-phenyl-1-propanone--, therefor.

Signed and Sealed this

Fourteenth Day of November, 2006

JON W. DUDAS
*Director of the United States Patent and Trademark Office*